Patented Aug. 14, 1951

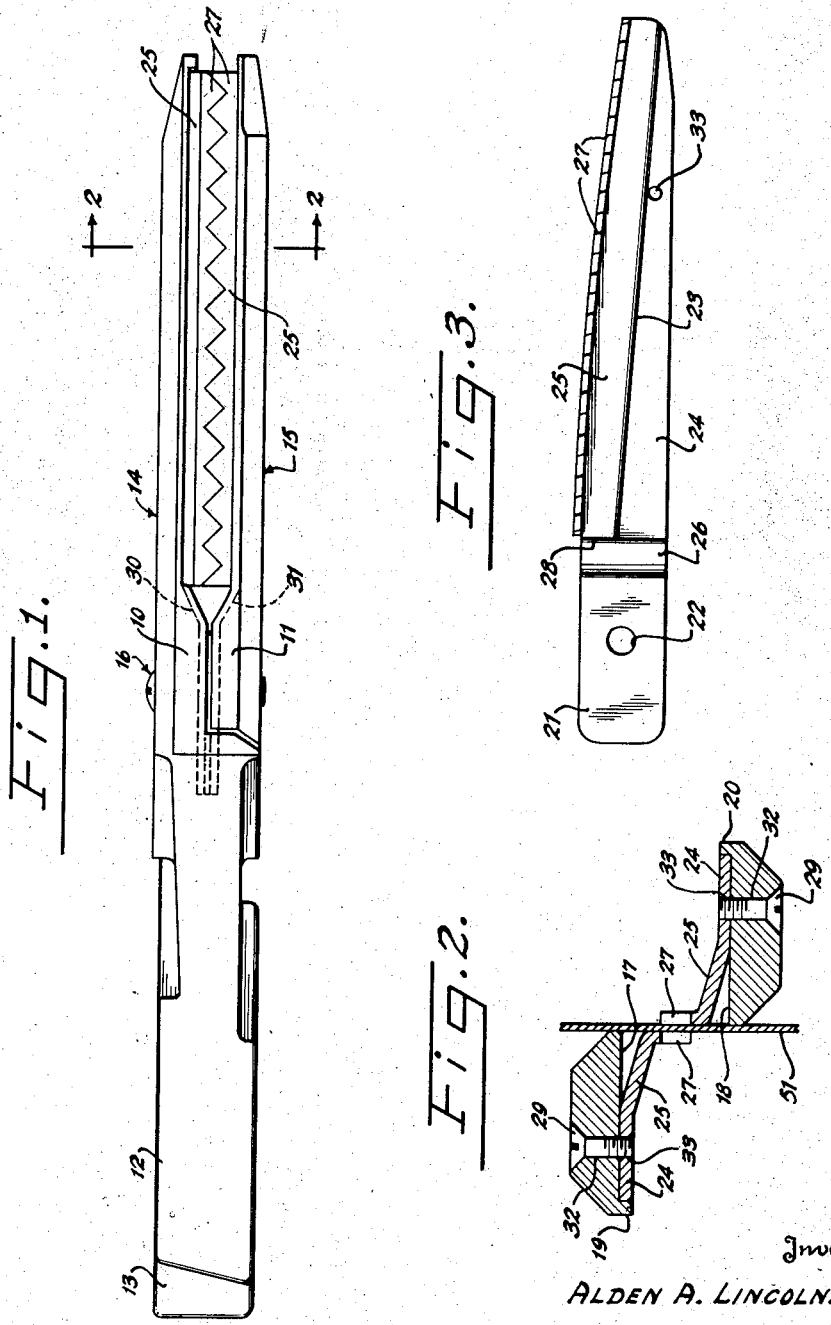

2,564,537

UNITED STATES PATENT OFFICE 2,564,537

PINKING SHEARS

Alden A. Lincoln, Bridgeport, Conn., assignor to Acme Shear Company, Bridgeport, Conn.

Original application March 12, 1948, Serial No. 14,522. Divided and this application March 16, 1949, Serial No. 81,747

3 Claims. (Cl. 30—230)

This invention relates to pinking shears, and a principal object of the invention is to provide pinking shears having their cutting blades so shaped and mounted that the cutting ability of the shears is increased.

Another object of this invention is to provide pinking shears so constructed that they can pink satisfactorily and efficiently materials over wider ranges of thickness and cutting resistance; and so constructed that resistance of material to being pinked by the shears tends to force the cutting edges of the shear blades against each other with increased pressure at their points of cutting engagement, whereby the stronger the resistance offered by the material being cut the greater will be the pressure.

A further object of this invention is to provide pinking shears which are pleasing in appearance, easy and convenient to handle and to use, efficient in action with respect to materials over a wide range of character and thickness, and are economical to manufacture in quantity.

Other objects of this invention will be in part obvious and in part pointed out hereinafter.

This application is a division of my application Serial No. 14,522, filed March 12, 1948, for Pinking Shears.

In accordance with this invention the shears include a pair of shear blades pivoted together, each blade carrying a row of pinking teeth, the teeth projecting at right angles to the plane of cutting movement of the blades and each row extending lengthwise of the plane of cutting movement of the blades, and the cutting edges of the teeth of the two blades progressively contacting each other as the blades are opened and closed. Each of these rows of pinking teeth is presented along an edge of a longitudinal platelike part which has some resiliency and in transverse aspect inclines from the teeth outwardly from the plane of the cutting movement of the shears so that pressure of the teeth against the material between them and being cut will tend to turn the plate-like parts to a greater degree of inclination to the plane of cutting movement of the shears and consequently increasing the pressure of the cutting edges of the complementary pinking teeth against each other during the cutting operation. The more resistance offered by the material to being cut the greater will be the force tending to change the inclination of the plate-like parts and the greater will be the pressure of the cutting edges of the pinking teeth against each other. Thus the cutting ability of the shears to pink material of increased resistance to pinking and of increased thickness is enhanced.

In order that a clearer understanding of this invention may be had, attention is hereby directed to the accompanying drawings, forming a part of this application and illustrating certain possible embodiments of this invention, and in which:

Fig. 1 is an edge plan view of a pair of shears embodying this invention;

Fig. 2 is a sectional view thereof and is taken on the line 2—2 of Fig. 1, but showing the shears about to cut material shown between the two sets of pinking teeth; and Fig. 3 is a plan view of one of the cutting elements which each blade has.

Similar reference characters refer to similar parts throughout the several views of the drawings.

Referring to the drawings, the shears include two complementary shear body parts each having a pivot portion 10 and 11 with a handle portion 12 and 13 extending from one end and a blade portion 14 and 15 extending from the other end, the two parts being pivoted together at their pivot portions by a pivot construction indicated generally at 16.

The complementary blade portions have flat and parallel inner surfaces 17, 18 which face each other and are spaced somewhat apart, and each has along its outer edge an inwardly directed flange 19, 20 forming an abutment shoulder therealong. Each of the blade portions is adapted to carry and support a cutting element, such, for instance, as is shown in Fig. 3, and which is made of a strip or thin plate of material, such as cutlery steel, having some resiliency. Each cutting element has a pivot portion 21 having an aperture 22 for receiving the pivot connection 16, and a blade portion 23 shaped to have two longitudinally extending portions 24 and 25, and an intermediate slanting shoulder portion 26 intermediate the portions 21 and 23. The portion 24, of the blade portion 23 is adapted to lie flat against the flat surface 17 or 18 of one of the shear body blade portions 14 or 15, where it is adjacent the flange 19 or 20 and with the base portion 24 abutting edgewise against the shoulder formed by the flange, and the other portion 25 being angularly related to portion 24 so as to incline away from the shear body surface 17 or 18 when the cutting element blade portion 24 is in place thereon, and the outer edge of portion 25 presenting a row of pinking teeth 27 extending away from the shear body blade portion 15 or 16 and at right angles to the plane of cutting movement of the shears. At the inner end of the row of pinking teeth the element is cut as at 28 to permit the portion 25 to be angularly related to the portion 24. Preferably a screw 29 extending through a hole 32 in the shear body blade portion 14 or 15 and screwed into a threaded hole 33 in the portion 24 of the cutting element holds the blade portion of the cutting element tightly against the blade portion of the shear body; and the shoulder formed by the flanges 19 or 20 holds the blade portion of the cutting element against movement on the shear body blade portion in a direction opposite to cutting movement of the shears. The intermediate portion 26 is adapted to rest against a slanting surface 30 or 31 of the shear body which is intermediate the blade portion 14 or 15 and the pivot portions 10 or 11 thereof.

The shear body parts 14 and 15 with the cutting elements in place thereon may be pivoted together by any suitable pivot or pivot assembly. For instance, the ordinary screw pivot 16 may be employed.

When the cutting teeth engage material, indicated at 51 in Fig. 2, to cut it the material opposes cutting movement of the teeth and pressure in the plane of cutting movement of the shears is applied to the teeth, which, as stated, project at right angles to this plane, and due to the fact that the cutting element portions 25 of the cutting elements are inclined to the line of the pressure and outwardly from the blade body portions, the pressure applies a torque to the cutting element blade portions 25 which tends to flex them to a greater degree of inclination to the shear body blade surfaces 17 and 18 and to the plane of cutting movement and to tend to move the pinking teeth toward the opposite cutting element and thus to cause the cutting edges of the pinking teeth to press more tightly together. It will be apparent that the greater the resistance offered by the material being cut the greater the torque will be and the greater will be the pressure holding the pinking teeth together during the cutting. In consequence the shears are capable of satisfactorily pinking material of increased thickness and of increased resistance to cutting.

Accordingly shears may be constructed in accordance with this invention which are exceedingly efficient and effective with materials over a wide range not only of quality but also of thickness, may be manufactured economically and to be pleasing in appearance, easy and convenient to handle and in which the tension adjustment of the blades will not be disturbed by the use of the shears.

As many changes may be made in the above construction without departing from the scope of the invention it is understood that all matter contained in the above description or shown in the accompanying drawings be interpreted as illustrative and not in a limiting sense.

What I claim is:

1. Shears of the character described including, in combination, two pivotally connected blades, each blade including a resilient member which is transversely inclined to the plane of cutting movement of the blades, each blade having along an edge of its resilient member a row of pinking teeth extending toward the other blade in a plane normal to the direction of cutting motion of the blades, said two rows of pinking teeth coacting to pink-cut material, the resistance offered by the material being cut by the teeth tending to flex the resilient members to a greater degree of incline to the plane of cutting movement and toward the opposite blade and to press the cutting edges of said rows of teeth more tightly against each other.

2. Shears of the character described including in combination, two complementary shear body parts, each having a pivot portion and a handle at one side of said pivot portion and a blade portion extending from the opposite side of said pivot portion, the two body parts being pivoted together at their pivot portions, each blade portion having a flat inner surface parallel with and spaced from the inner surface of the other blade portion, a cutting element supported on each of said blade portions, each cutting element having a flat portion lying flat-wise against the flat inner surface of the blade portion and having a resilient longitudinal portion extending from said flat portion at an inclination in transverse aspect to the flat blade portion surface and having along its outer edge a row of pinking teeth which project therefrom in a plane normal to the plane of cutting movement of the blades, whereby pressure of the teeth against material between them and being cut will tend to turn the said inclined portions of the cutting elements to a greater degree of inclination to the plane of cutting movement of the blades and increase the pressure of the cutting edges of the complementary rows of pinking teeth against each other during the cutting operation.

3. Shears of the character described including in combination, a pair of complementary carrier blades pivoted together and provided with manipulating handles, each blade having a flat inner surface parallel with and spaced from the flat inner surface of the other blade, each blade having an abutment flange along its outer edge and projecting inwardly therefrom, a relatively thin longitudinal cutting element supported on the inner surface of each blade and having a flat portion lying against and screwed tightly to said surface and an edge lying against said abutment flange and a longitudinal portion integral with said flat portion and extending in transverse aspect at an inclination to the flat blade portion and presenting along its edge a row of pinking teeth having their cutting edges in a plane normal to the plane of cutting movement of the blades, whereby pressure of the teeth against the material between them and being cut will tend to turn said inclined portions to a greater degree of inclination to the plane of cutting movement of the shears and increase the pressure of the cutting edges of the complementary rows of pinking teeth against each other during the cutting operation.

ALDEN A. LINCOLN.

REFERENCES CITED

The following references are of record in the file of this patent:

UNITED STATES PATENTS

| Number | Name | Date |
| --- | --- | --- |
| 1,965,443 | Wyner | July 3, 1934 |
| 2,204,071 | Dalley | June 11, 1940 |
| 2,284,664 | Kissling | June 2, 1942 |
| 2,395,896 | Mitchell | Mar. 5, 1946 |
| 2,395,897 | Dethcart | Mar. 5, 1946 |